A. J. HUDSON.
Churn-Dashers.

No. 145,107.                               Patented Dec. 2, 1873.

Witnesses.
N. W. Almqvist
Sedgwick

Inventor.
A. J. Hudson
PER
Attorneys.

UNITED STATES PATENT OFFICE.

ANDREW J. HUDSON, OF CAMDEN, TENNESSEE.

IMPROVEMENT IN CHURN-DASHES.

Specification forming part of Letters Patent No. 145,107, dated December 2, 1873; application filed October 25, 1873.

*To all whom it may concern:*

Figure 1:
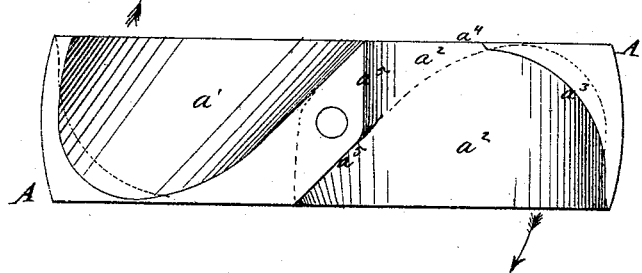
Figure 2:
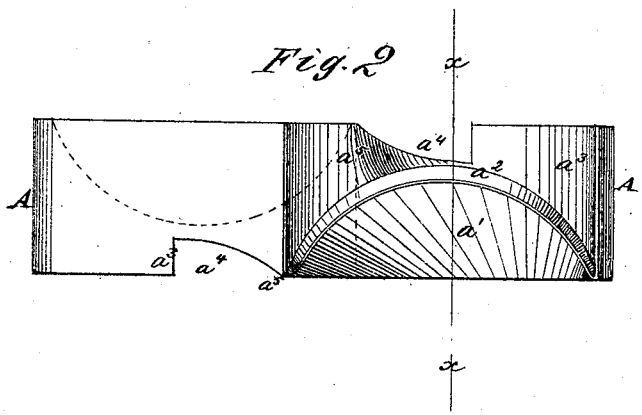
Figure 3:
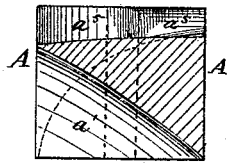

Be it known that I, ANDREW J. HUDSON, of Camden, in the county of Benton and State of Tennessee, have invented a new and useful Improvement in Churn-Dasher, of which the following is a specification:

Figure 1 is a top view of my improved churn-dasher. Fig. 2 is a side view of the same. Fig. 3 is a cross-section of the same taken through the line $x\,x$, Fig. 2.

My invention has for its object to furnish an improved churn-dasher, simple in construction, inexpensive in manufacture, and effective in operation, bringing the butter very quickly, and developing all the butter that may be in the milk; and it consists in the dasher provided with grooves or concaves, recesses, shoulders, and notches, as hereinafter more fully described.

Similar letters of reference indicate corresponding parts.

A represents the dasher, which is designed to be attached to a rotating shaft, and driven by gearing in the ordinary manner. The dasher A is made in the form of a two-armed bar, and is attached at its center to the rotating shaft, as indicated by the hole in the center of said dasher. Upon the upper side of one arm of this dasher A is formed a rounded, hollow, or concave groove, $a^1$, inclining outward and upward, and in the under side of the other arm is formed a similar groove, $a^1$, inclining outward and downward. Upon the under side of one arm of the dasher A, below the groove $a^1$, and upon the upper side of the other arm of said dasher A, above the other groove, $a^1$, is formed a recess, $a^2$, having a convex bottom and vertical sides. The outer shoulder, $a^3$, of the recess $a^2$, is curved, and extends from the forward side of the dasher-arm to about the center of the rear side of said arm, where it terminates in a notch, $a^4$. The forward part of the inner shoulder, $a^5$, is inclined, as shown in Fig. 1, and is vertical, as shown in Fig. 2, and its rear part is at right angles with the length of the dasher A, as shown in Fig. 1, and is inclined or curved laterally, as shown in Fig. 2. By this construction the dasher, in its movement, throws the milk in currents in different directions, which currents collide with each other and with the sides of the churn, throwing the milk into violent agitation, bringing the butter in a very short time and developing all the butter there may be in the milk, thus producing better and more butter than an ordinary dasher.

Having thus described my invention, I claim as new and desire to secure by Letters Patent—

The dasher A, provided with the grooves or concaves $a^1$, the recesses $a^2$, the shoulders $a^3$ and $a^5$, and the notches $a^4$, constructed and arranged in connection with each other substantially as herein shown and described, and for the purpose set forth.

A. J. HUDSON.

Witnesses:
 A. M. LASHLEE,
 J. P. HUDSON.